(12) United States Patent
Joshi

(10) Patent No.: US 7,917,839 B2
(45) Date of Patent: Mar. 29, 2011

(54) SYSTEM AND A METHOD FOR INTERACTIVITY CREATION AND CUSTOMIZATION

(75) Inventor: Vikas Joshi, Maharashtra (IN)

(73) Assignee: Harbinger Knowledge Products, Maharashtra (IN)

( * ) Notice: Subject to any disclaimer, the term of this patent is extended or adjusted under 35 U.S.C. 154(b) by 1046 days.

(21) Appl. No.: 11/485,869

(22) Filed: Jul. 13, 2006

(65) Prior Publication Data

US 2007/0294664 A1    Dec. 20, 2007

(30) Foreign Application Priority Data

Jun. 1, 2006    (IN) .......................... 856/MUM/2006

(51) Int. Cl.
| | |
|---|---|
| G06F 17/00 | (2006.01) |
| G06F 17/20 | (2006.01) |
| G06F 17/21 | (2006.01) |
| G06F 17/22 | (2006.01) |
| G06F 17/24 | (2006.01) |
| G06F 17/25 | (2006.01) |
| G06F 17/26 | (2006.01) |
| G06F 17/27 | (2006.01) |
| G06F 17/28 | (2006.01) |
| G06F 3/00 | (2006.01) |
| G06F 9/44 | (2006.01) |

(52) U.S. Cl. ........ 715/202; 715/234; 715/255; 715/730; 715/731; 717/109

(58) Field of Classification Search .................. 715/234, 715/730, 731, 202, 255, 203; 717/109; 434/350, 434/362, 365
See application file for complete search history.

(56) References Cited

U.S. PATENT DOCUMENTS

| | | | |
|---|---|---|---|
| 2002/0178181 A1* | 11/2002 | Subramanyan et al. | ... 707/501.1 |
| 2004/0043362 A1* | 3/2004 | Aughenbaugh et al. | ...... 434/118 |
| 2005/0079477 A1* | 4/2005 | Diesel et al. | .................. 434/350 |
| 2005/0208461 A1* | 9/2005 | Krebs et al. | ................... 434/365 |
| 2006/0204942 A1* | 9/2006 | Kimball | .................... 434/307 R |
| 2007/0209004 A1* | 9/2007 | Layard | .......................... 715/731 |
| 2007/0218448 A1* | 9/2007 | Harmeyer et al. | ............ 434/350 |

* cited by examiner

*Primary Examiner* — Stephen S Hong
*Assistant Examiner* — Nicholas R Hasty
(74) *Attorney, Agent, or Firm* — Kusner & Jaffe

(57) ABSTRACT

A system and a method for the creation and customization of interactivity are described. An interactivity builder is provided that includes a Interaction Model Selector Module, an interactivity editor, and an Interaction Model Library comprising Interaction Models. An interaction model selector is also provided that accesses to the available Interaction Models. A user is allowed to select an Interaction Model from the Interaction Model Library through the Interaction Model Selector and the Interaction Model Selector accepts the user-selected interaction model and copies it to create an interactivity that can be any time modified by the interactivity editor according to input received from the user. Interactivity thus created can be used in training modules. The invention could also be used equally well in other applications, such as, for instance, websites, presentations, electronic documents, online advertising, e-commerce and more such applications.

29 Claims, 10 Drawing Sheets

SYSTEM AND A METHOD FOR INTERACTIVITY CREATION AND CUSTOMIZATION

FIELD OF THE INVENTION

The present invention relates to a system and a method for interactivity creation and customization and more particularly to a system and a method that allows customization of interactive training modules and contents therein.

DESCRIPTION OF THE BACKGROUND ART

Training plays an important role in the development of various fields such as education, business etc. The most common way of training is teaching through books or notebooks, pamphlets and other written material, which contain printed or written form of subject matter. Such printed material, once printed or written in the form of books etc, cannot be edited manually. Further, it is difficult to correct or add additional matters to such printed material. It also becomes difficult to provide interactive training sessions using such printed material.

Therefore training techniques are being developed involving computers and different computer related applications for presenting various subject matters. Thus, organizations are increasingly adopting e-learning. This has fueled the demand for current and relevant e-learning content.

To cater to the growing demand for e-learning content, organizations are adopting rapid authoring tools. Rapid authoring tools enhance the productivity of content authors, and reduce the time and cost per hour of e-learning content over conventional programming-oriented tools. Rapid authoring tools employ ready-made templates for course overview, content page layout, course navigation, questions, tests, glossary, score report and such other course elements.

One impediment to this push for rapid authoring tools comes from learners themselves. They describe their learning experience resulting from rapid authoring tools as a non-engaging, boring, page-turning activity. This results in low attention and high instances of non-completion. Clearly this is undesirable.

The solution to this problem is the use of what is known in the art as interactivity. The learner is kept engaged and actively participating in the learning experience. Interactivity is embedded in an electronic course, and uses graphics, text, sound animation etc. to stimulate action. Further, interactivity elicits user actions using input devices such as mouse, keyboard etc and provides a feedback response. Traditionally, interactive schemes are generally designed and developed using various programming languages known. For example, a programmer may develop an interactive program in a training module that allows a user to pick and drag various country-flags and drop them at their respective country locations. These programs may be developed using tools like JAVA, FLASH etc. However, there are several disadvantages to this approach.

First of all, the trainer needs to think of an 'interactivity' appropriate to the learning goal and subject matter at hand. This involves thinking effort with little or no head-start.

Next, the trainer needs to explain the interactivity to a programmer so that he or she could build that interactivity using relevant programming tools and put it into the training module. If the trainer wants to put some other interactive element in the same module, he or she may have to call the programmer once again to get the task done. Thus, each time there is a requirement of one or more programmers or experts who are able to develop such interactive modules through programming languages or codes.

Another problem concerns modifications. A teacher or a trainer or any other person not skilled in the art of programming may not be able to modify his/her interactivity in the training module. Even if the teacher or trainer were able to do the required programming, it is still a significant cost and time overhead.

Another problem associated with programming is debugging. A person skilled in handling one language may not be able to diagnose and debug problems occurring in an application designed and implemented in another language.

Therefore a need exists for a system and a method for creating and customizing interactivity wherein the need of programmers may be avoided.

SUMMARY OF THE INVENTION

An object of this invention is to provide a system and a method for interactivity creation and customization.

In accordance with this invention there is provided an Interactivity Builder, which includes an Interaction Model Library comprising Interaction Models. There is also provided an Interaction Model Selector, which accesses the available Interaction Models from the Interaction Model Library. The Interaction Model Selector prompts a user to make a selection and receives user selection. The interaction model selector is adapted to accept a user-selected Interaction Model and to copy it to create an interactivity.

The Interactivity Builder tool further includes an interactivity editor, which is adapted to modify the interactivity according to input received from a user. This tool also includes output generator, which is adapted to generate an output file for the modified interactivity. The output file may be a single file or a combination of multiple output files that can be used in present or other applications.

According to one embodiment of the invention, the interaction model is created in the form of three components: an XML component, an executable component and the collection of media assets. Once the model is ready, it can be customized to create interactivity.

The XML component has a parameter section and a description section. Under the parameter section, the XML stores one or more parameters.

The executable component comprises an input processor, a play-mode user interface, a select-mode user interface and an edit-mode user interface. Executable component is adapted to receive from the calling means at least three parameters namely, data path, media path and mode. Based on data path, the input processor locates the XML, reads its contents and parses them. Based on the media path, the input processor is adapted to locate and access the media assets/files. Based on the value of the mode selected, which is selected from a group of modes consisting of play mode, select mode or edit mode. Any one mode can be invoked at one time. The invoked user interface uses parsed data and accessed media files to activate the interactivity.

The play-mode user interface is adapted to function according to the desired interactivity functionality.

The select-mode user interface is adapted to cooperate with a pointing device. The activation of the mouse pointer (clicks) is received by the interface and the select mode user interface is further adapted to map the captured part with appropriate parameters that can be used to customize that part of the interactivity. Select-mode user interface provides a way to pass the user-selected parameter defined in XML to the calling means.

The edit-mode user interface is adapted to allow the user to perform supported customization operations, which are cumbersome or sometimes impossible to perform in a parameter-based text-editing mode, and are much easier to perform graphically. Edit-mode user interface also allows graphic editing, creates objects corresponding to the supported graphic editing and updates the parsed XML accordingly.

The executable component is adapted to play from a desktop client as well as through a web browser.

Media assets are adapted to be stored in a data storage device, which consist of sound, video, graphics and other multimedia contents. The interactivity can be published and generated as an output. The interactivity can also be edited and modified.

An interactivity editor means is adapted to modify interactivity according to inputs received from the user. The interactivity editor further includes interactivity preview component adapted to provide a preview of the modified interactivity. The interactivity editor further includes a tree view parameter selector, a text view parameter selector and a graphic view parameter selector, which enable a user to select a parameter of the interactivity for customization.

The interactivity editor means parses the XML component and populates the tree view parameter selector means. The tree view parameter selector is adapted to display a hierarchical representation of the parameters of interactivity. When the user activates (clicks) a tree level, the parameter corresponding to user-selected tree level is passed to the selection controller. The tool parses the XML component and populates the text view parameter selector. The text view parameter selector is adapted to display a textual description that further includes hyperlinks to parameters of interactivity. Once user activates (clicks) a text hyperlink, the parameter corresponding to user-selected hyperlink is passed to the selection controller.

The interactivity editor means executes the interactivity by invoking the executable component in a select mode. The execution of the interactivity creates a graphic view parameter selector that is adapted to display a graphic view of the interactivity. The graphic view parameter selector further includes image hyperlinks to parameters of the interactivity. Once user activates (clicks) an image hyperlink, the parameter corresponding to user-selected hyperlink is passed to the selection controller.

According to one embodiment of the invention, interactivity editor is further adapted to receive interactivity customizable parameters and to validate them. The interactivity editor means also includes a graphic editor. The tool executes the interactivity by invoking executable in edit mode, which in turn creates a graphic editor. Further the graphic editor is adapted to receive inputs from the user, such as for example the location and size of screen areas to zoom in, animation path, and other graphic input. Graphic editor is further adapted to convert the graphic input into an XML object and passes it to the change controller.

The XML component is then updated and a preview of the updated XML component is generated. Thus, the changes made by the user to the interactivity using any of the available views consistently reflect in all views.

The user activates the interactivity builder that is involved in building the interactivity using the interaction model. The interaction selector is adapted to access the model library through selection interface. The user selects a model form the model library. The selected interaction model is passed to interactivity editor. A copy of the model selected is then stored.

In one embodiment of the invention, the interactivity editor is adapted to prompt the user to perform editing operations on the interactivity. The interactivity editor provides parameter editing operations or graphic editing operations. The user selects a parameter for parameter editing. The selection is usually done using the tree view parameter selector wherein user selects a parameter for customization by activating (clicking) the corresponding parameter in tree view, or by using the text view parameter selector wherein user selects a parameter for customization by activating (clicking) a corresponding hyperlink, or by using graphic parameter selector wherein user selects a parameter for customization by activating (clicking) its graphic representation. The user is presented with editor form and fills out any values for parameter attributes.

In another embodiment of the invention, the tool can be adapted in a manner such that the preview of the interactivity is possible to enable feedback and verify the effects of the editing operations. The tool is further adapted to enable a user to perform graphic editing operations such as for example creating image hyperlinks, animation paths and other such operations. Still further, the tool is adapted to save the interactivity In another embodiment of the invention, the interactivity editor means is implemented as a wizard for the user to follow in a step by step manner. The user can enter formation requested in each step and can preview the interactivity as a result of new information entered.

The present invention thus provides a system and a method for interactivity creation and customization that can be efficiently utilized in the field of e-learning. Indeed, it is contemplated that the method and system disclosed herein may be advantageously utilized to create highly effective training modules in a variety of fields. It can also be used in websites, presentations, electronic documents, online advertising, e-commerce and more such applications. Thus, the potential uses of the disclosed method and system are essentially limitless.

Following are some of the advantages provided by the present invention.
  (i) According to the method and system disclosed herein, the addition of customized interactivity elements to an electronic course becomes quick, easy and intuitive. This is due to the following factors
    a. When thinking of the right interactivity, the trainer has a head-start due to the interaction model library
    b. The dependence of trainer on programmers is reduced.
    c. The time and cost involved in modification are reduced, because the customization of interactivity does not require programming.
    d. The overhead due to repeated testing and debugging is avoided.
  (ii) The output can be in the form of a single file output or a multiple file output, making it easy to integrate with various other tools and used in e-Learning courses, websites, PowerPoint® presentations as well as help documents.

Other objects, features and advantages of the invention will be apparent from the drawings, and from the detailed description that follows below.

BRIEF DESCRIPTION OF THE DRAWINGS

Reference will be made to embodiments of the invention, examples of which may be illustrated in the accompanying figures.

DESCRIPTION OF THE INVENTION

A system and a method that allows customization of interactive training modules and contents are described. The disclosed system and method facilitates the creation, implementation and utilization of interactive training modules in a wide range of educational, professional and/or business pursuits, and greatly enhances the speed, ease and efficiency with which interactive training modules are created, implemented and utilized. The structure of a preferred embodiment of the invention will be illustrated now with the help of FIG. 1 through FIG. 10.

Figure 1:
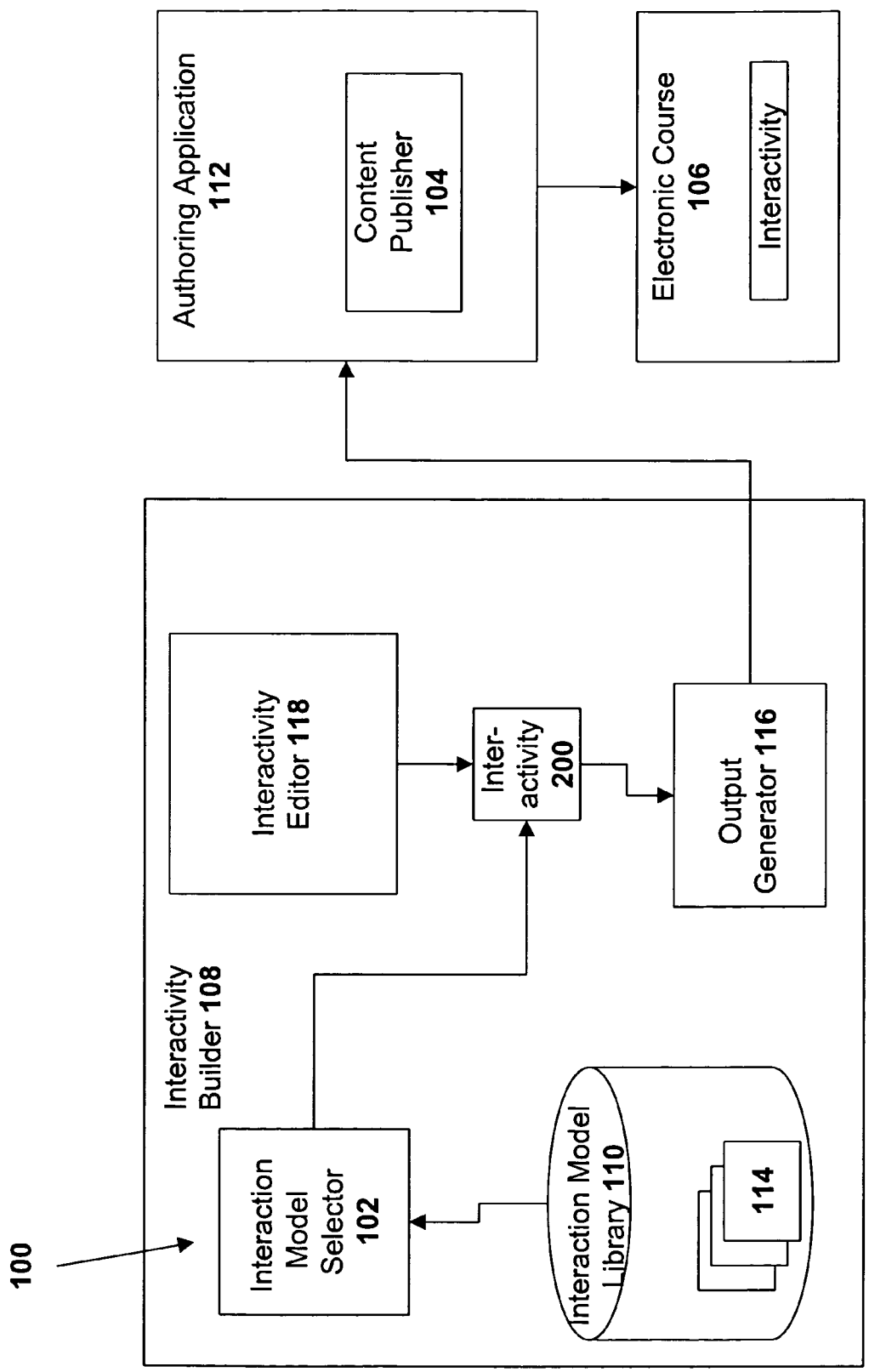
FIG. 1 is a block diagram illustrating a preferred embodiment of the present invention, used in an interactive e-learning content development system.

FIG. 1 is a block diagram illustrating an interactive e-learning content development system. As per the present invention the e-learning content development system 100 includes an interactivity builder 108, an authoring application 112 and electronic courses 106.

The Interactivity Builder 108 includes an Interaction Model Library 110 comprising Interaction Models 114 and an Interaction Model Selector 102. The Interaction Model Selector 102 accesses the available Interaction Models 114. The Interaction Model Selector 102 prompts a user to make a selection and receives user selection. The Interaction Model Selector 102 accepts user-selected interaction model 114 from interaction selector 102 and copies it to create an interactivity 200.

The Interactivity Builder 108 further includes an interactivity editor 118 which modifies the interactivity 200 according to user input it receives. Said Interactivity Builder 108 further includes an output generator 116 which sends the modified interactivity 200 to content publisher 104 of the Authoring Application 112 that generates electronic courses 106.

The output generator 116 generates an output file for the modified interactivity. This output can be a combination of files or one file. The output can be used in other applications.

Figure 2:
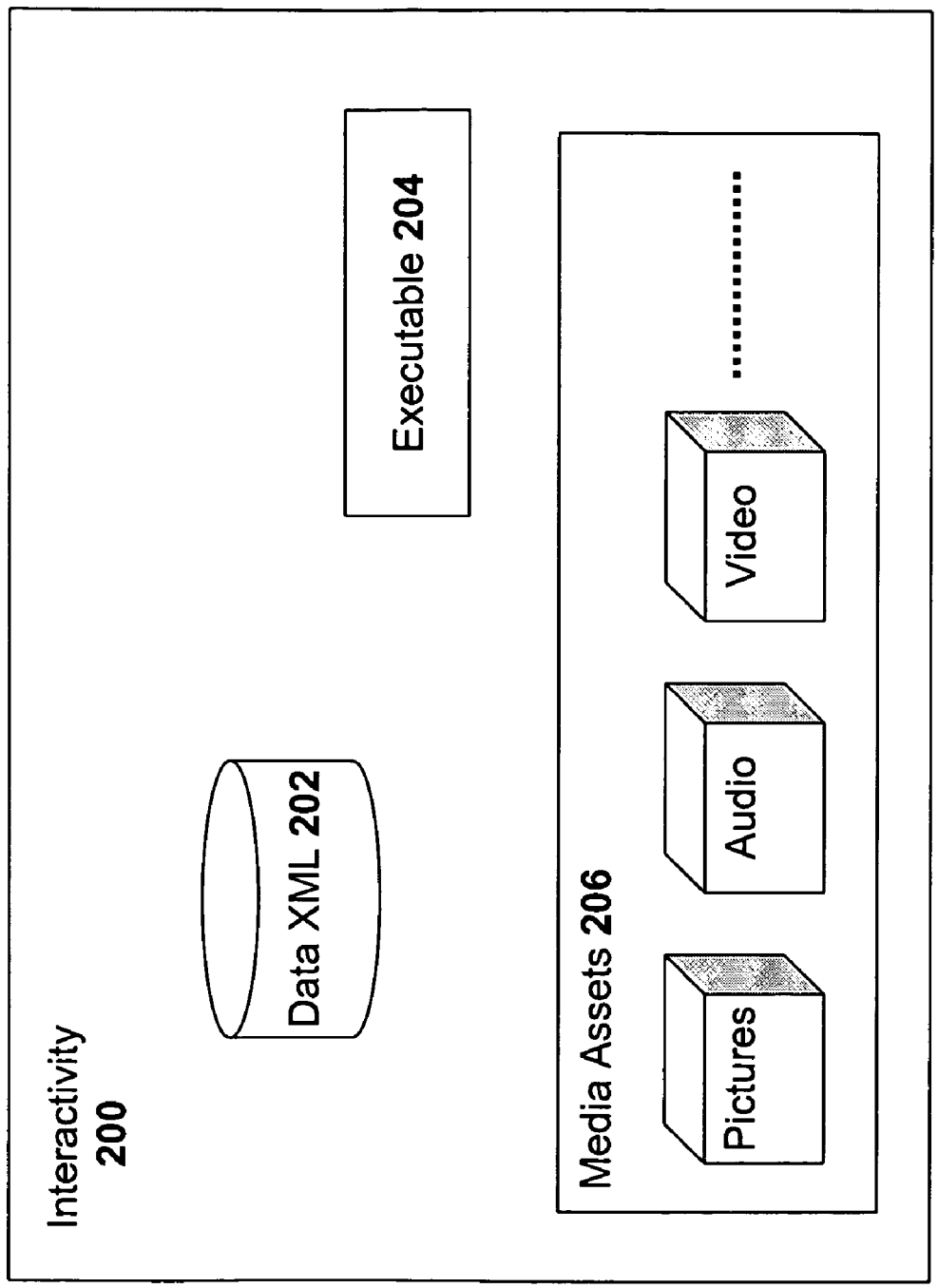
FIG. 2 shows the general components of an interactivity as per one embodiment of the invention.

FIG. 2 shows the general structure of interactivity 200 and the interaction models 114 present in the Interaction Model Library 18. As shown in FIG. 2, interactivity 200 comprises three components: a data XML 202, an executable 204 and media assets 206. Media assets 206 is basically a collection of media files such as Pictures, audio, video etc. These three components; the data XML 202, the executable 204 and the media assets 206 have to be developed first in order to create an interaction model 114. Once the model is ready, it can be customized to interactivity 200 easily.

Figure 3:
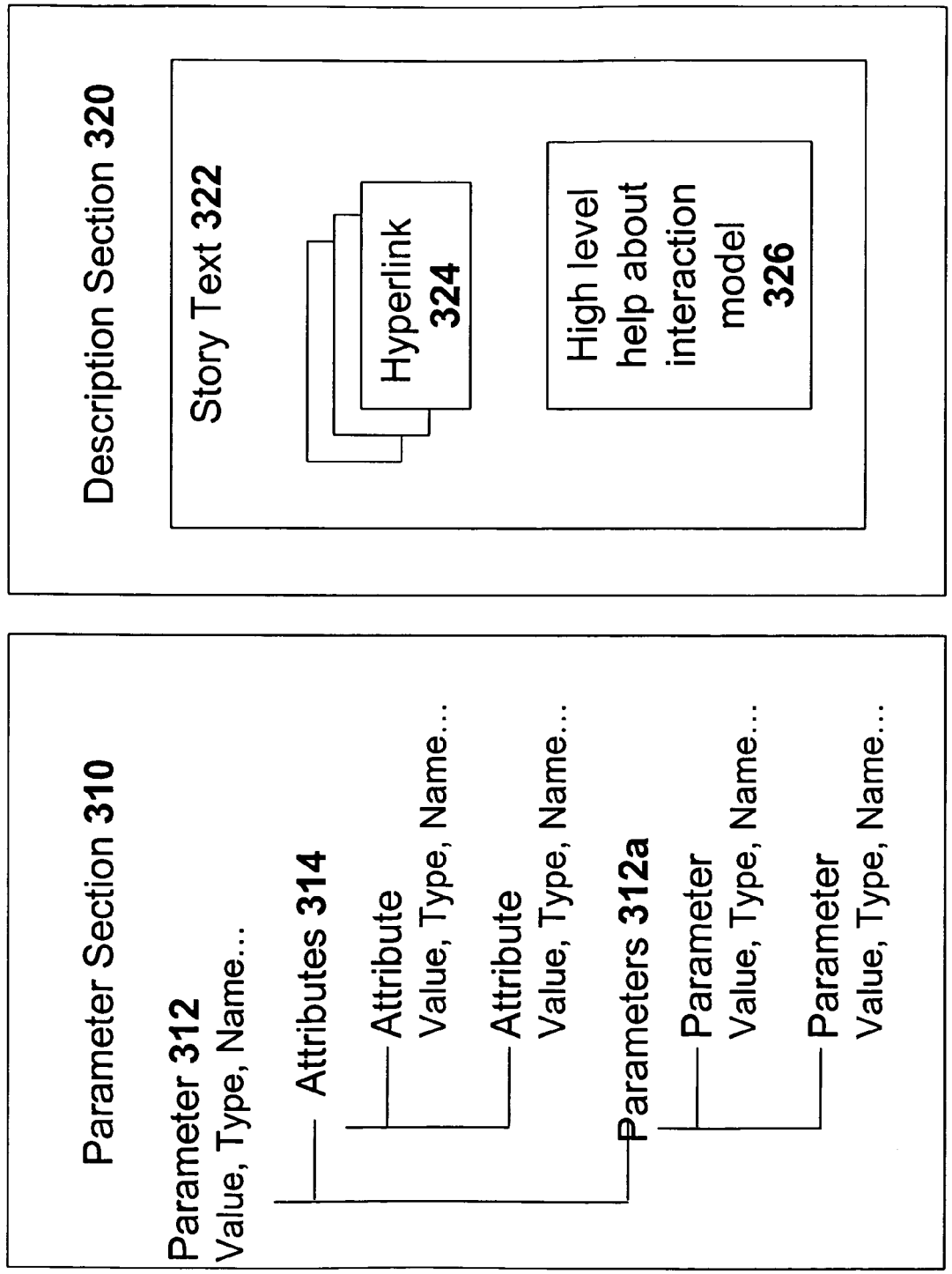
FIG. 3 shows the sections of a data XML.

In a preferred embodiment the XML file 202 comprises a parameter section 310 and a description section 320 as shown in FIG. 3. Other forms of data store are also possible.

Under parameter section 310, the data XML 202 stores one or more parameters 312. A parameter is a grouping of related information about the interactivity. For example, title, background graphic or speed of display can be parameters. For a further example, in an interactivity where successive quadrants are displayed, the time interval between the appearance of successive quadrants will be a parameter.

In specific, a parameter 312 contains one or more attributes 314. For example, a title in the above example can have font, color and text as attributes.

Some parameters also contain further parameters. These are termed collection parameters 313*a*. For example, in a multiple-path animation interactivity, all paths together is one collection parameter, and each individual path is a parameter contained in it.

Under description section 320, the data XML stores a story text 322 with hyperlink 324 references to parameters corresponding to words that act as hyperlinks. For example, a hyperlink on the word "order" in the sentence "You can determine in what order you would like the player to build up the pyramid" will refer to a parameter "DisplaySequence". The description section 320 also contains high level help about interaction model 326 as shown in FIG. 3.

Figure 4:
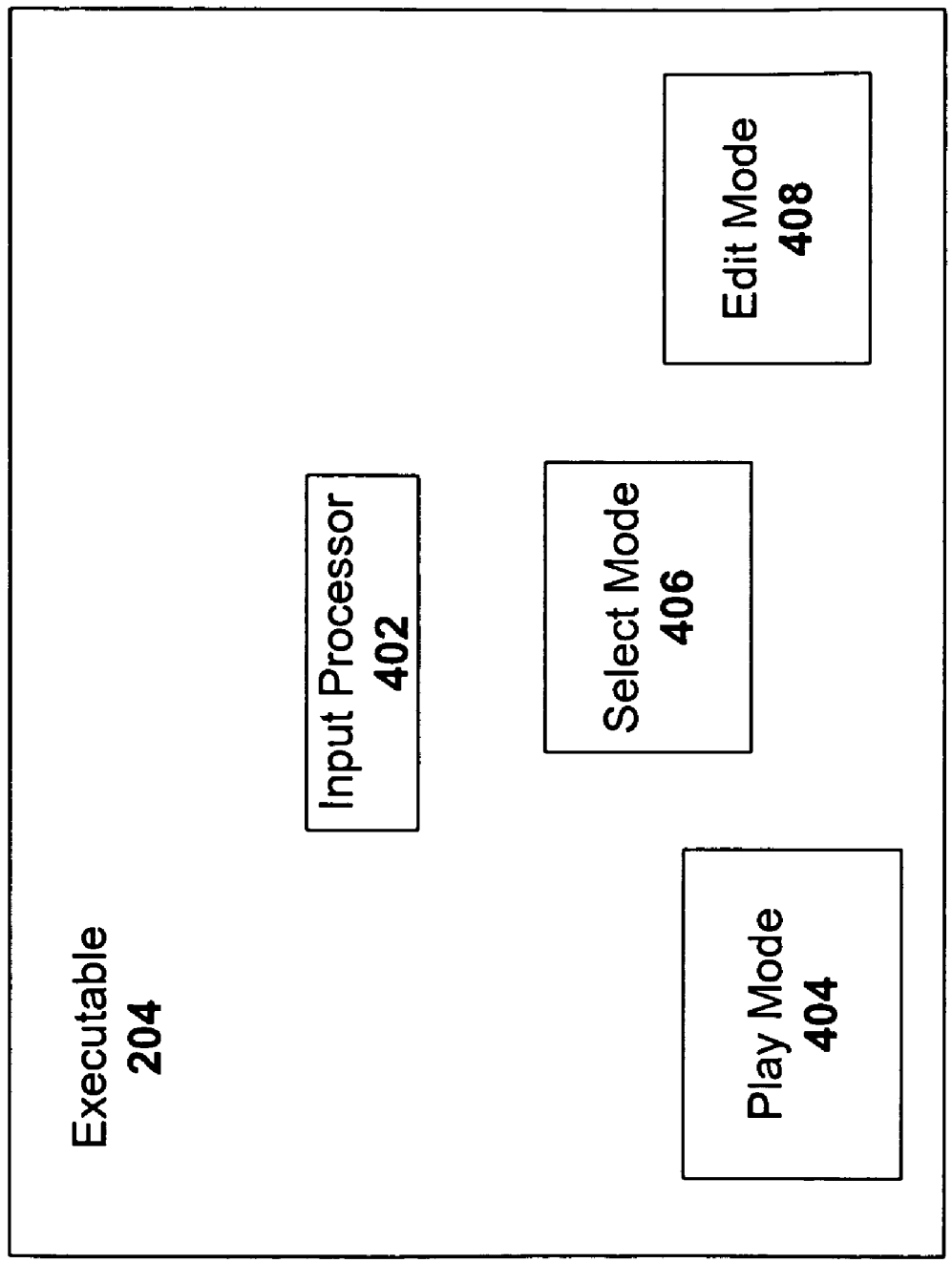
FIG. 4 shows the components of the executable.

FIG. 4 shows an executable 204 comprising an input processor 402, a play-mode user interface 404, a select-mode user interface 406 and a edit-mode user interface 408.

The Executable 204 receives from the calling program at least three parameters namely, data path, media path and mode. Based on data path, the input processor 402 locates data XML 202, reads its contents and parses them. Based on the media path, the input processor 402 locates and accesses the media files. Based on the value of mode, which can be play, select or edit, one out of the user interfaces 404, 406, 408 is invoked respectively. The invoked user interface uses parsed data and accessed media files to play the interactivity.

The play-mode user interface 404 is programmed to the desired interactivity functionality. For example, a classify-objects interactivity may include the drag and drop functionality where the learner may classify given objects into a number of groups. Or as another example, a explore-diagram interactivity may include the functionality to roll a cursor over a part of a diagram and view its details.

The select-mode user interface 406 is programmed to capture mouse pointer click on parts of the interactivity and to map those with appropriate parameters that can be used to customize that part of the interactivity. For example, clicking on the innermost circle in concentric-circles interactivity will cause the parameter of innermost circle to be selected, so further customization of its color, label and description is possible. Select-mode user interface 406 provides a way to pass the user-selected parameter defined in data XML to the calling program.

The edit-mode user interface 408 is programmed to allow the user to perform supported customization operations which are cumbersome or sometimes impossible to perform in a parameter-based text editing mode, and are much easier to perform graphically. For example, a particular model may support the creation of clickable areas on screen. A preferred way to do this is using the edit-mode interface graphically, rather than enter pixel co-ordinate values.

Edit-mode user interface allows graphic editing, creates objects corresponding to the supported graphic editing and updates the parsed data XML accordingly. For example, addition of a clickable area results in the addition of a corresponding parameter under the collection of clickable areas in the parsed data XML.

In the preferred embodiment, since the executable 204 must play from a desktop client as well as through a web browser, it is built using Flash, a technology by Macromedia of San Francisco. Executables thus built can be played on most popular web browsers with the use of Flash plug-ins, also supplied by Macromedia. It is also possible to use Java applets in place of Flash. Alternatively, it is also possible to use ActiveX, a technology by Microsoft of Redmond, or any other suitable software development platform. In a preferred implementation, Media assets 206, is a folder which comprises digital files for sound, video, graphics and other multimedia content.

Figure 5:
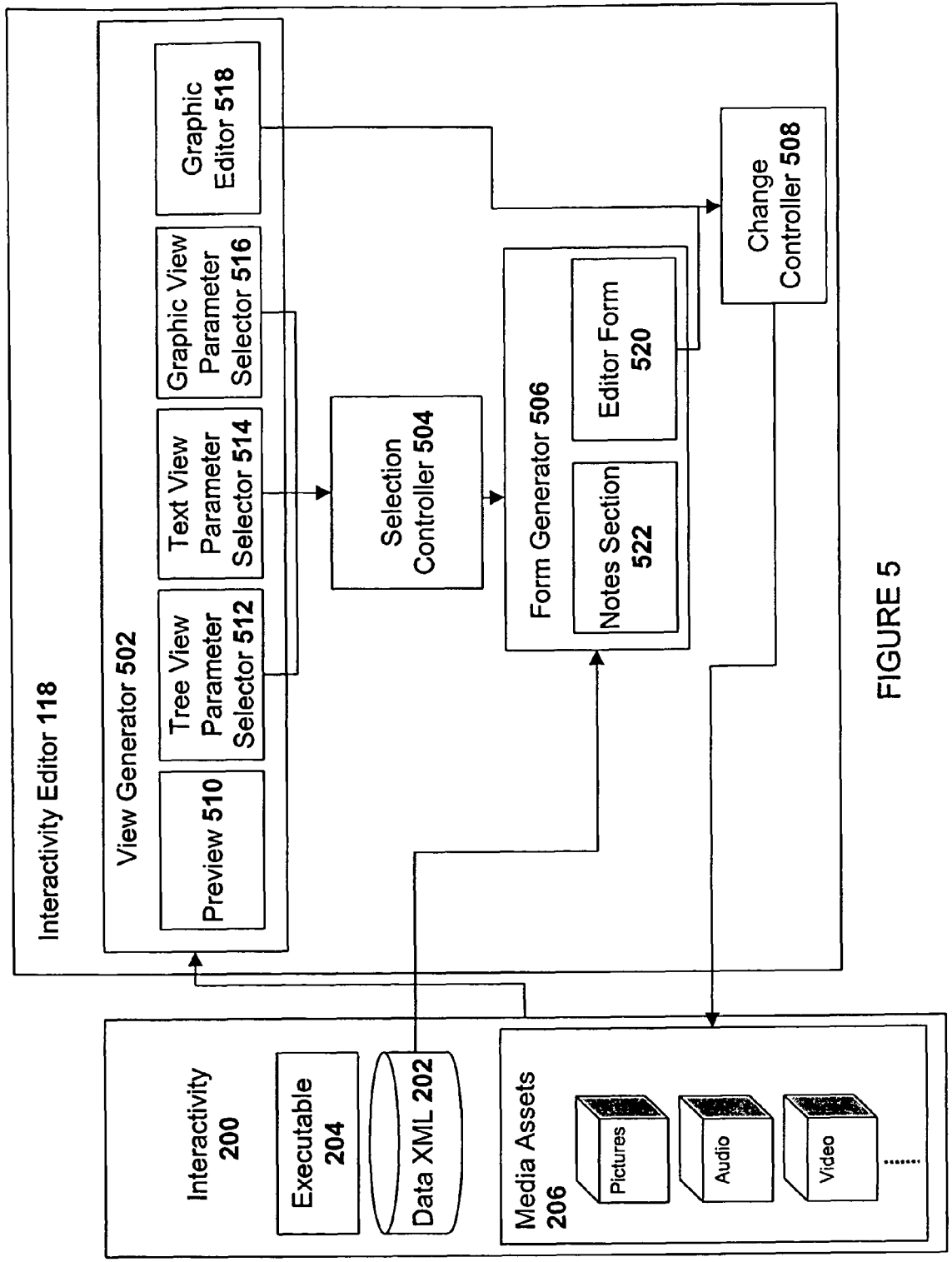
FIG. 5 is a block diagram that shows the interrelationship of the various components of the preferred embodiment of the interactivity editor.

FIG. 5 shows the components of interactivity editor 118. The interactivity editor 118 modifies interactivity 200 according to user input it receives. The interactivity editor 118 includes view generator 502, selection controller 504, form generator 506, and change controller 508. The function of each of these components will be explained in the appropriate context in the following paragraphs.

The view generator 502 further includes interactivity preview 510. View generator 502 runs interactivity 200 by invoking executable 204 in play mode. This creates interactivity preview.

In order to enable user to select a parameter 312 of the interactivity 200 for customization, the view generator 502 further includes a tree view parameter selector 512, a text view parameter selector 514 and a graphic view parameter selector 516.

View generator 502 parses data XML 202 and populates the tree view parameter selector 512. The latter displays a hierarchical representation of the parameters 312 of interactivity 200. Once user clicks on a tree level, the parameter 312 corresponding to user-selected tree level is passed to the selection controller 36.

View generator 502 parses data XML 202 and populates the text view parameter selector. The latter displays a textual description that further includes hyperlinks to parameters 312 of interactivity 200. Once user clicks on a text hyperlink, the parameter 312 corresponding to user-selected hyperlink is passed to the selection controller 504.

View generator 502 runs interactivity 200 by invoking executable 204 in select mode. This creates graphic view parameter selector 516 that displays a graphic view of the interactivity 200. The graphic view parameter selector 516 further includes image hyperlinks to parameters 312 of interactivity 200. Once user clicks on a image hyperlink, the parameter 312 corresponding to user-selected hyperlink is passed to the selection controller 504.

The selection controller 506 passes the parameter 312 it receives to the form generator 506, which generates editor form 520 and Notes section 522.

From user, the editor form 520 receives interactivity attribute data for the selected parameter, validates it and passes it to the change controller 508.

The editor 118 further includes graphic editor 518. The view generator 502 runs interactivity 200 by invoking executable 204 in edit mode. This creates graphic editor 518.

From user, the graphic editor 518 receives graphic input, such as for example the location and size of screen areas to zoom in, animation path, and other graphic input. Graphic editor 518 converts it into XML object and passes it to the change controller 508.

Change controller 508 updates the data XML 202 of interactivity 200. The view generator regenerates preview 510, all parameter selectors 512, 514 and 516, editor form 520, Notes section 522 as well as graphic editor 518. Thus, any changes that the user makes to the interactivity using any of the available views will consistently reflect in all views.

Figure 6:
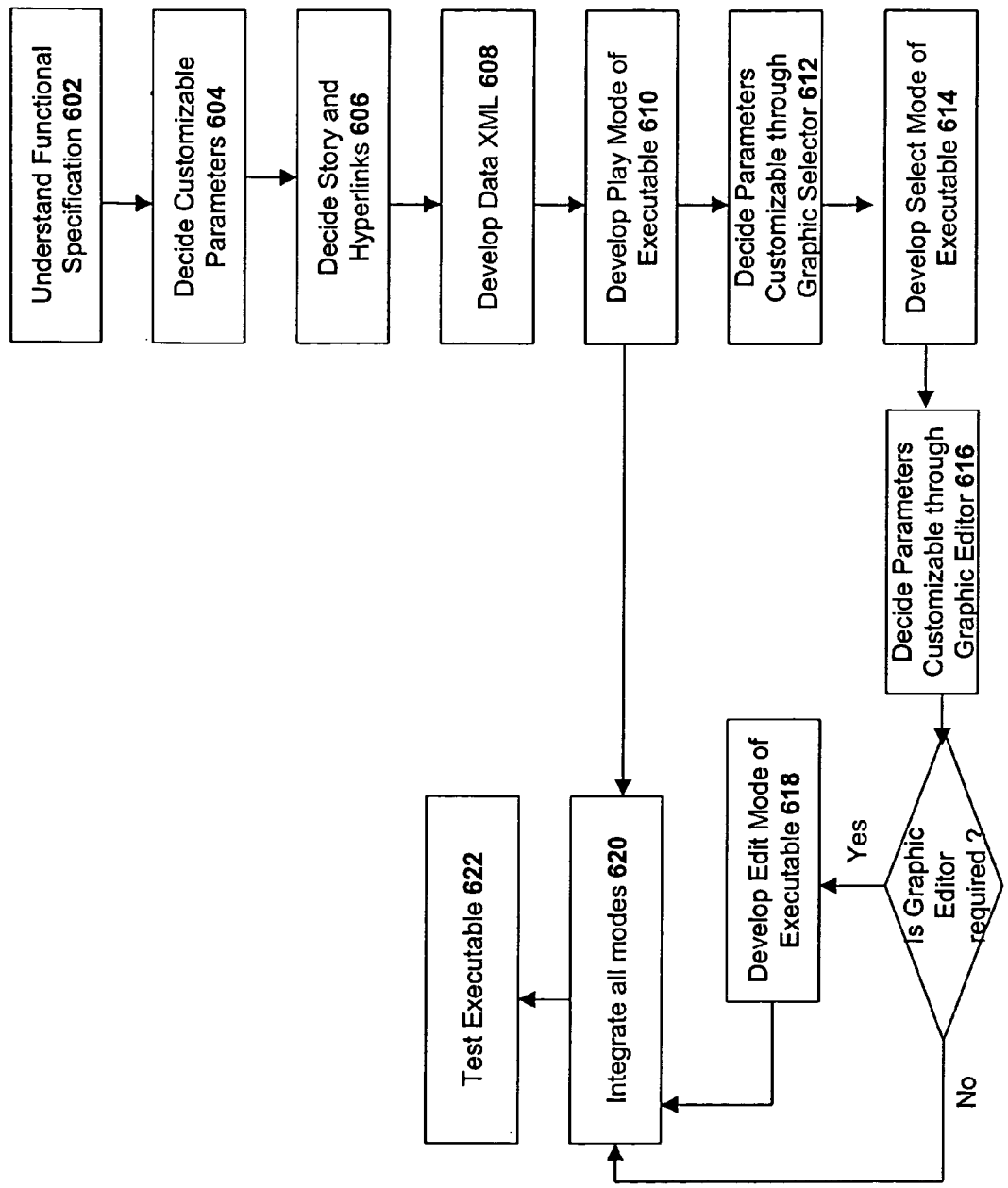
FIG. 6 is a flow chart illustrating the process of creating an interactivity model.

In one embodiment of the present invention a method of creating interaction model is disclosed as illustrated in flowchart in FIG. 6. This method is used by the person tasked with creating a new interaction model.

Starting with step 602, understand the functional specification of the interaction model.

In step 604, identify the parameters which need to be variable so that content authors can customize interaction model to create new interactivity.

In step 606, identify the parameters to be selectable from a text view parameter selector, and create a textual description or story. Further identify words in the text leading to those parameters. These words serve as hyperlinks.

In step 608, prepare the data XML 82 for the interaction model as per specifications.

In step 610, develop executable of the model 114 which includes an input processor and play-mode user interface.

In step 612, decide the parameters which can be customized through graphic view parameter selector 516.

In step 614, develop the select mode user interface of the model 114 by determining clickable areas, or image hyperlinks, on the user interface of the interactivity in select mode and writing code that maps them on parameters identified step 612.

In step 616, decide the parameters, if any, that need to be customized using a graphic editor.

In step 618, develop the edit mode user interface of the model 114 by allowing graphic operations with the user interface of the interactivity in background, and by writing code that maps the result of those operations with parameters defined in step 616.

In step 620, integrate all the modules of the model and test it in step 622. Once finalized, add the interaction model to the Interaction Model Library 110.

Figure 7:
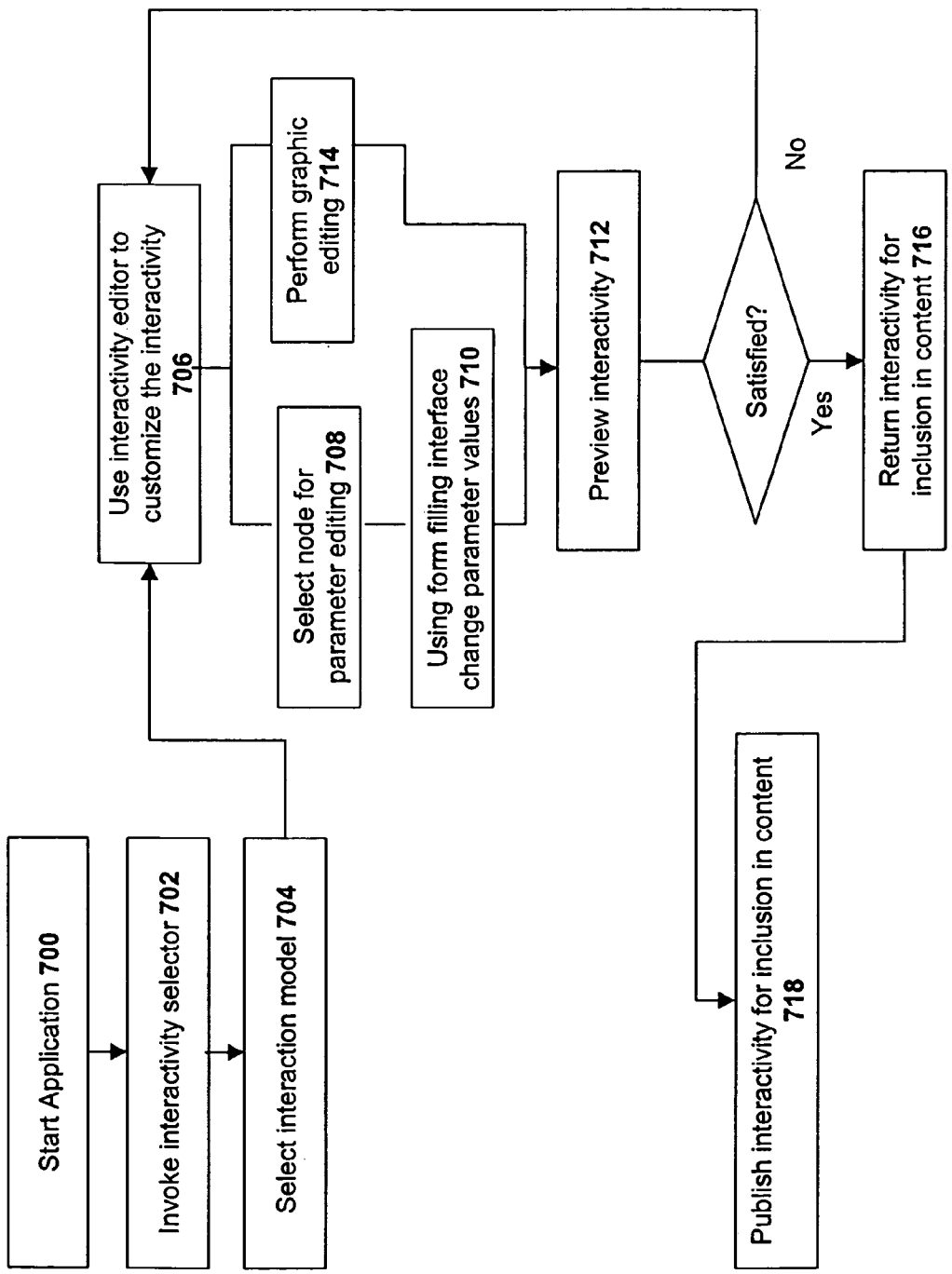
FIG. 7 is a flow chart illustrating the process of using a model to create an interactivity in a preferred embodiment of the present invention.
Figure 8:
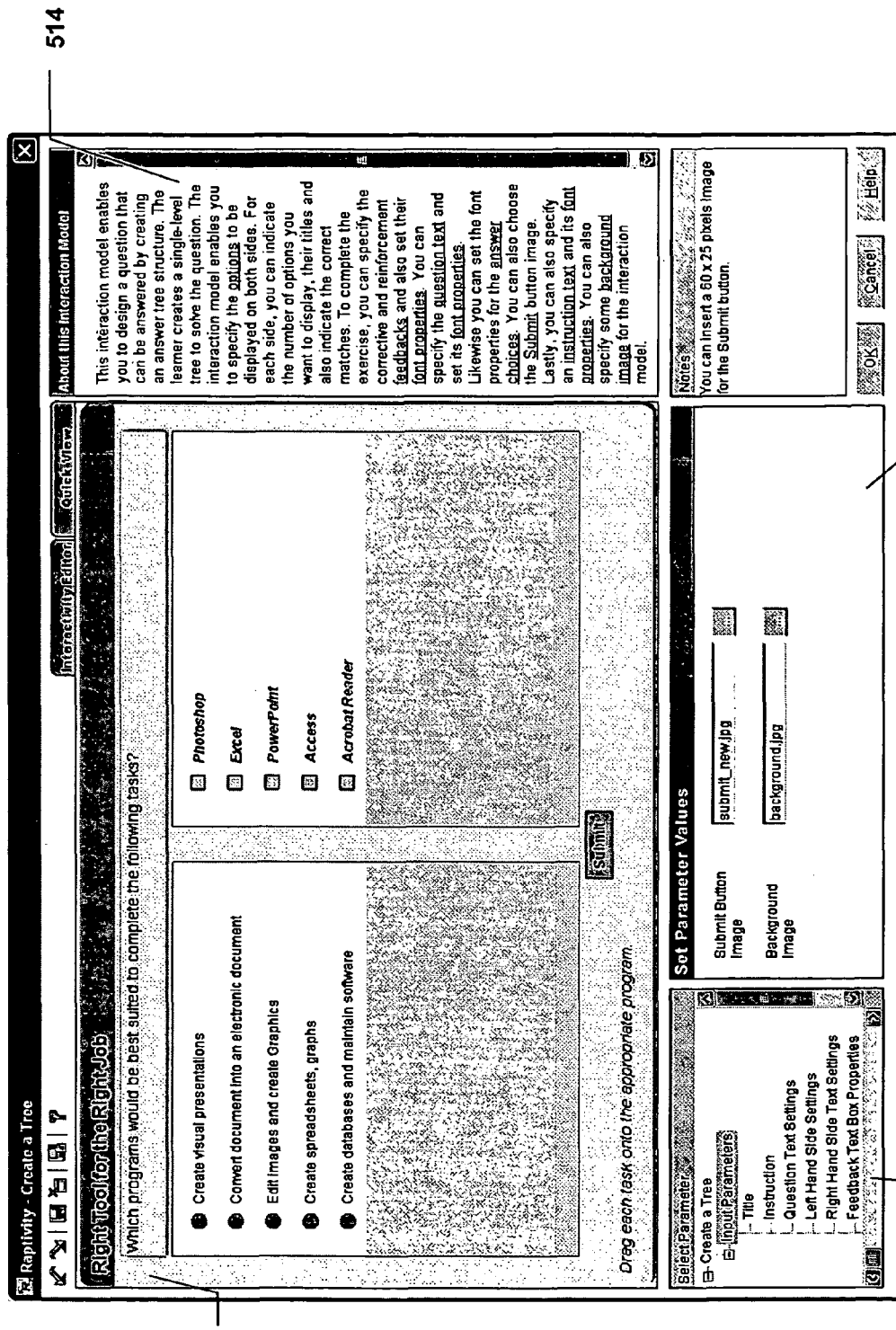
FIG. 8 is a screen display showing the interactivity editor.
Figure 9:
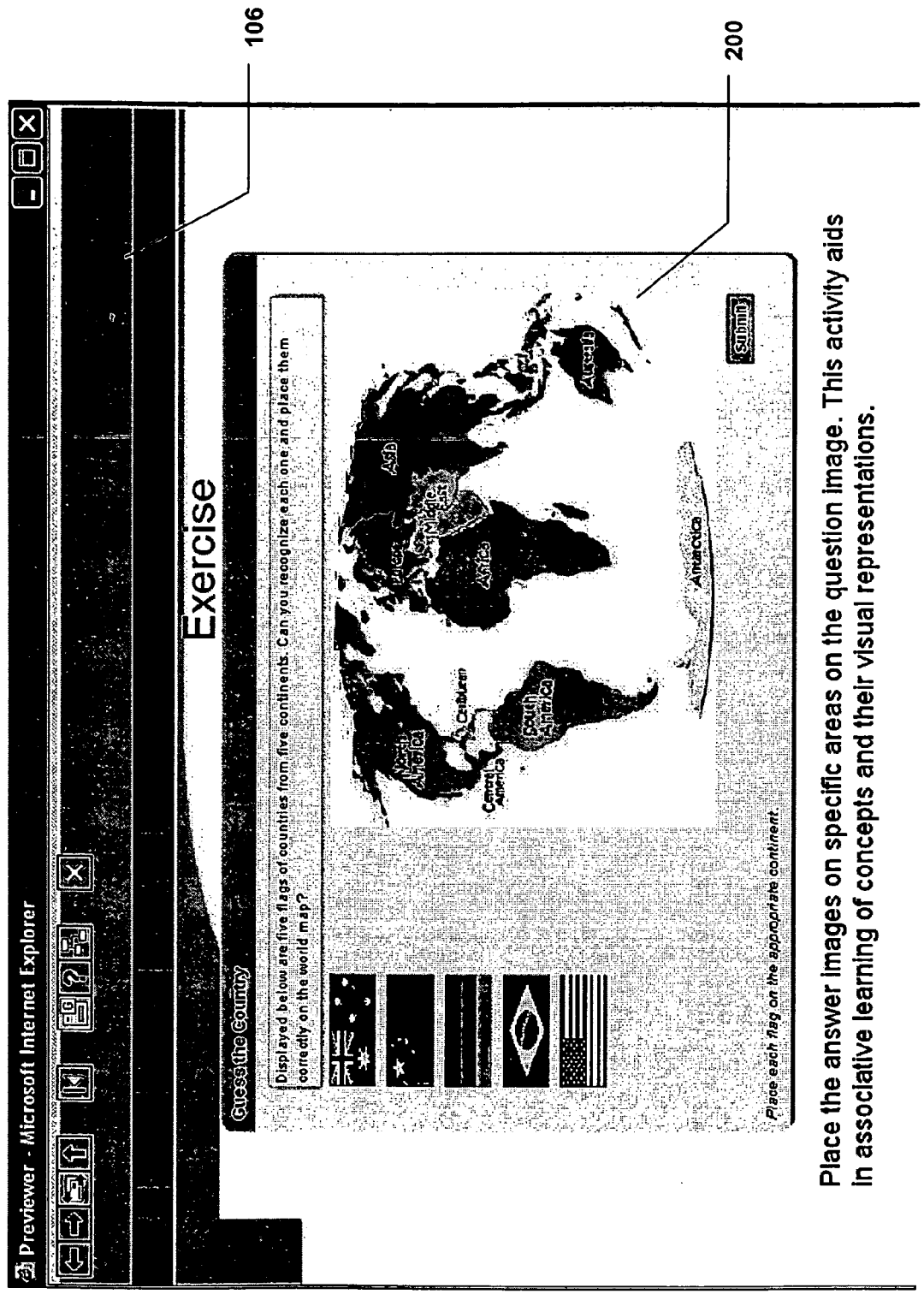
FIG. 9 is a screen display showing an interactivity inserted in an electronic course page.
Figure 10:
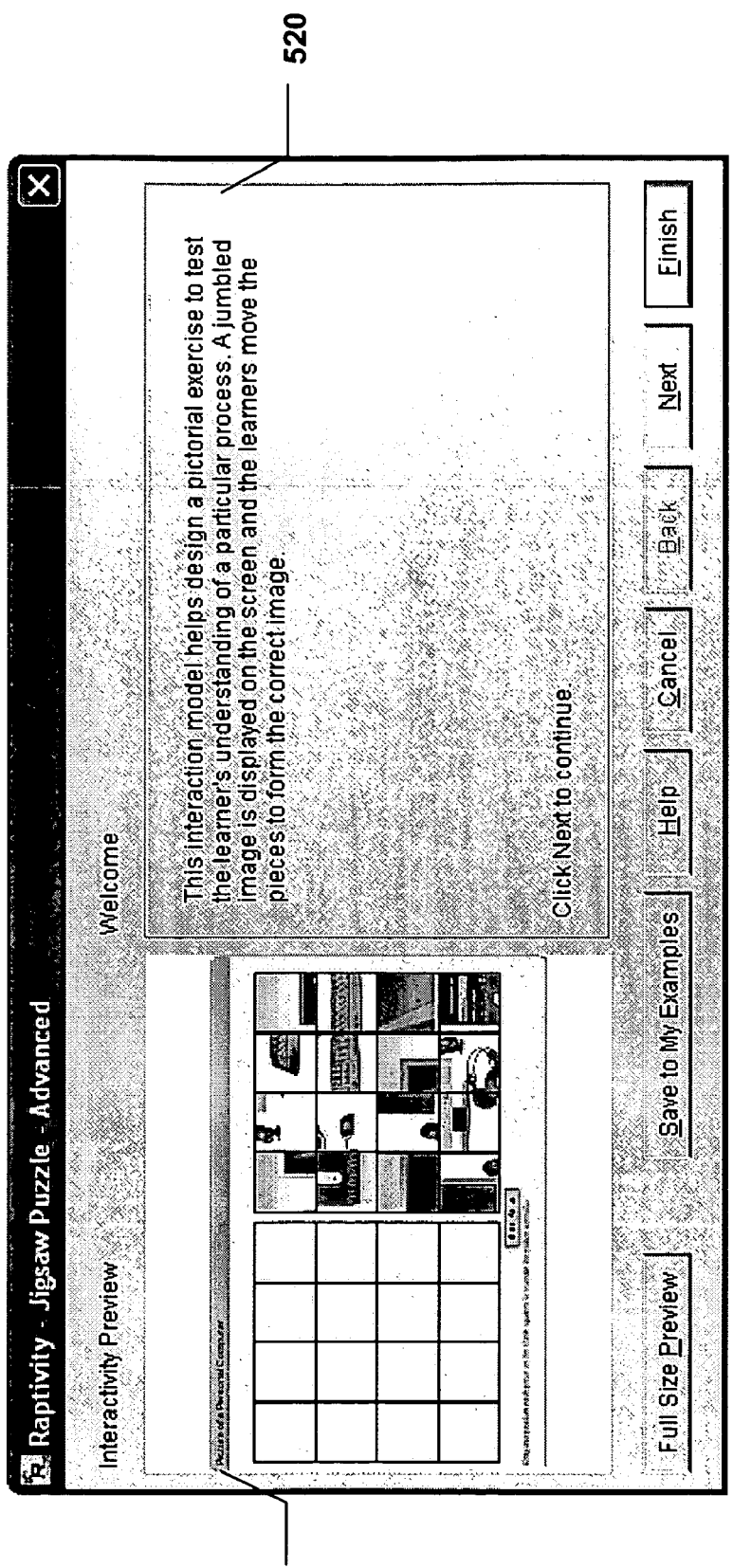
FIG. 10 is a screen display showing a preferred screen layout of wizard, according to an alternative embodiment of the present invention.

Operation of the preferred embodiment of the invention will now be illustrated with the help of flowchart in FIG. 7 as well as screen shots in FIG. 8 and FIG. 9.

The method can be initiated by starting the application in step 702, the content author invokes the interaction selector 102. At this time, the interaction selector accesses library 110 through selection interface 112 and presents models 114 to the user to select from.

In step 704, the content author makes a selection. The selected interaction model is passed to interactivity builder 108. A copy is created in interactivity 200.

In step 706, the interactivity editor prompts the content author to perform any editing operations on the interactivity 200. These may include parameter editing operations or graphic editing operations. A screen shot of interactivity editor is shown in FIG. 8.

In step 708, the user selects a parameter for parameter editing. This selection could be using tree view parameter selector 512 wherein user selects a parameter for customization by clicking on the corresponding parameter in tree view, or using the text view parameter 514 selector wherein user selects a parameter for customization by clicking on a corresponding hyperlink, or using graphic parameter selector 516 wherein user selects a parameter for customization by directly clicking on its graphic representation.

In step 710, the user is presented with editor form 520 and fills out any values for parameter attributes.

In step 712, the user watches a preview 510 of the interactivity, which reflects the effect of editing operations performed.

In step 714, the user performs graphic editing operations such as for example creating image hyperlinks, animation paths and other such operations.

When the editing process is complete, the user moves to step 716 where the interactivity is saved and returned to the authoring application.

In step 718, the authoring application publishes interactivity for inclusion in content. FIG. 9 shows an electronic course page. Although figure shows only the electronic course, the interactivity thus created and customized can be used in many applications such as online advertising, e-commerce, computer related presentations etc.

In an alternative embodiment, the interactivity editor is implemented as a series of steps for the user to complete, known in the art as wizard. A preferred screen layout of wizard is included in FIG. 10. Here the user fills out information at each step and has an opportunity to preview the interactivity as a result of new information entered.

Thus the present invention provides a tool that can be efficiently utilized in the field of education, online advertising, e-commerce, computer related presentations, websites, online documents, e-books, e-learning and much more where a user or a trainer is allowed to easily customize the training kit according to his/her subject and needs. The user need not be a programmer to introduce several interactivities in his training kit. The present invention allows the user to select the interactivity of his choice from a pre-built library provided by the present invention.

As understood by one of ordinary skill, programming is an art which allows many variations to achieve a single functionality. The given sequence of processing steps, or the broad organization thereof, or screen layouts, are only exemplary, and there can be variations that result in the same functionality of the overall system without departing from the spirit and scope of the invention. Accordingly, it is intended that all matter contained in this disclosure is interpreted as illustrative and not in a limiting sense. It is considered that one of ordinary skill in the art, based on the disclosure herein, can implement the disclosed invention using techniques known to those of ordinary skill, and that those techniques vary without departing from the spirit and scope of the invention.

It is also understood that the claims in this disclosure are intended to cover generic and specific features of the invention described herein, and all statements of the scope of the invention which is a matter of language might be said to fall therebetween.

The terms and expressions which have been employed in this disclosure are used as the terms of description and not of limitations, and there is no intention in the use of such terms and expressions to exclude any equivalents of the features shown and described or portions thereof, but it is recognized that various modifications are possible within the scope of the claims.

Having described the invention, the following is claimed:

1. An interactivity creation and customization computer system including a hardware processor comprising:
   an interactivity builder including:
   an Interaction Model Library comprising a plurality of Interaction Models that respectively define a plurality of interactivities, each Interaction Model having:
   (1) a data XML component including (a) a parameter section comprised of one or more parameters, wherein at least one of said parameters contains attribute data, and (b) a description section containing story text with hyperlink references to parameters corresponding to words that act as hyperlinks,
   (2) an executable component receiving (a) a data path for locating the data XML component, (b) a media path for locating media assets, and (c) a mode value indicative of a play mode, a select mode or an edit mode, said executable component including a play-mode user interface programmed to a desired interactivity functionality, a select-mode user interface programmed to capture mouse pointer clicks on parts of the interactivity, an edit-mode user interface programmed to allow a user to perform customization operations, and an input processor for locating the data XML component using the data path, reading contents of the data XML component, and parsing contents of the data XML component, and
   (3) media assets;
   an interaction model selector that allows a user to select an Interaction Model from the Interaction Model Library, thereby creating an interactivity for accessing available Interaction Models;
   an interactivity editor for modifying the interactivity of the selected Interaction Model according to user inputs to create a modified interactivity, said interactivity editor allowing a user to select a parameter of the interactivity for modification; and
   an output generator for generating an output file for the modified interactivity, said output file having a format appropriate for use in an authoring application.

2. An interactivity creation and customization computer system as claimed in claim 1, wherein at least one of said plurality of Interaction Models models a learning interaction appropriate for use in a training course in an electronic format.

3. An interactivity creation and customization computer system as claimed in claim 1, wherein the input processor locates and accesses the media assets using said media path received by said executable component, thereby enabling a user to play the interactivity.

4. An interactivity creation and customization computer system as claimed in claim 1, wherein the play-mode user interface, the select-mode user interface and the edit-mode user interface are invoked according to said mode value received by said executable component.

5. An interactivity creation and customization computer system as claimed in claim 1, wherein the media assets are a comprised of media files that include sound, video, graphics and other multimedia contents.

6. An interactivity creation and customization computer system as claimed in claim 1, wherein the executable component is played from a desktop client or through a web browser.

7. An interactivity creation and customization computer system as claimed in claim 1, herein the interactivity editor further comprises:
   a view generator,
   a selection controller,
   a form generator, and
   a change controller.

8. An interactivity creation and customization computer system as claimed in claim 7, wherein the view generator runs the interactivity by invoking an executable component in the play mode to create an interactivity preview in the interactivity editor.

9. An interactivity creation and customization computer system as claimed in claim 7, wherein the interactivity editor further includes the following selectors for selecting a parameter of the interactivity for modification:
- a tree view parameter selector for displaying a hierarchical representation of the parameters of the interactivity,
- a text view parameter selector for displaying textual description including hyperlinks to parameters of the interactivity, and
- a graphic view parameter selector for displaying a graphic view of the interactivity and enabling a user to select a parameter of the interactivity for customization,
- wherein the view generator parses the data XML component and populates the tree view parameter selector, said tree view parameter selector operating in coordination with the view generator, the selection controller, the form generator and the change controller.

10. An interactivity creation and customization computer system as claimed in claim 7, wherein the view generator parses the data XML component and populates a tree view parameter selector that displays a hierarchical representation of the parameters of the interactivity, said tree view parameter selector operating in coordination with the view generator, the selection controller, the form generator and the change controller.

11. An interactivity creation and customization computer system as claimed in claim 9, wherein the view generator parses the data XML component and populates the text view parameter selector.

12. An interactivity creation and customization computer system as claimed in claim 9, wherein the view generator runs the interactivity by invoking an executable component in select mode to create a graphic view parameter selector for displaying a graphic view of the interactivity.

13. An interactivity creation and customization computer system as claimed in claim 12, wherein the graphic view parameter selector further includes image hyperlinks to the parameters of the interactivity.

14. An interactivity creation and customization computer system as claimed in claim 7, wherein the selection controller passes a received parameter to the form generator, which that generates an editor form and notes section.

15. An interactivity creation and customization computer system claimed in claim 14, wherein the editor form receives interactivity attribute data for the selected parameter from the user, validates the attribute data and passes the attribute data to the change controller.

16. An interactivity creation and customization computer system as claimed in claim 7, wherein the view generator runs an interactivity by invoking an executable component in an edit mode to create a graphic editor in the interactivity editor.

17. An interactivity creation and customization computer system as claimed in claim 7, wherein a graphic editor receives graphic input from a user and converts it into an XML object and passes it to the change controller.

18. An interactivity creation and customization computer system as claimed in claim 7, wherein the change controller updates the data XML component of the interactivity.

19. An interactivity creation and customization computer system as claimed in claim 7, wherein the view generator regenerates preview, all parameter selectors and editor form, and a graphic editor to incorporate changes made by the user in the interactivity.

20. A method for interactivity creation and customization, the method comprising the steps of:
- creating a library of multiple Interaction Models that respectively define a plurality of interactivities, each Interaction Model having:
  - (1) a data XML component including (a) a parameter section comprised of one or more parameters, wherein at least one of said parameters contains attribute data, and (b) a description section containing story text with hyperlink references to parameters corresponding to words that act as hyperlinks,
  - (2) an executable component including receiving (a) a data path for locating the data XML component, (b) a media path for locating media assets, and (c) a mode value indicative of a play mode, a select mode or an edit mode, said executable component including a play-mode user interface programmed to a desired interactivity functionality, a select-mode user interface programmed to capture mouse pointer clicks on parts of the interactivity, an edit-mode user interface programmed to allow a user to perform customization operations, and an input processor for locating the data XML component using the data path, reading contents of the data XML component, and parsing contents of the data XML component,
  - and (3) media assets;
- providing an interaction model selector that allows a user to select available Interaction Models from the library, thereby creating an interactivity;
- creating an Interactivity Builder that includes an interactivity editor for modifying the interactivity of the selected Interaction Model according to user inputs to create a modified interactivity, said interactivity editor allowing a user to select a parameter of the interactivity for modification; and
- generating an output file for the modified interactivity, said output file having a format appropriate for use in an authoring application.

21. A method for interactivity creation and customization as claimed in claim 20, wherein the step of creating a library of multiple Interaction Models comprises the steps of:
- identifying functional specification of each interaction model;
- identifying variable parameters relating to text and images that enable user customization of the interaction model and creation of a new interactivity;
- creating a textual description and graphical images for each interaction model;
- identifying words and images that can be used as hyperlinks leading to said parameters;
- preparing the data XML component for each interaction model as per specifications in the required format; and
- developing the executable component of all interaction models.

22. A method for interactivity creation and customization as claimed in claim 20, wherein the interactivity editor includes a text view parameter selector to allow the user to select said identified parameters relating to text.

23. A method for interactivity creation and customization as claimed in claim 21, wherein the interactivity editor includes a text view parameter selector to allow the user to select said identified parameters relating to text.

24. A method for interactivity creation and customization as claimed in claim 21, wherein the executable component of the interaction model includes an input processor and a play-mode user interface.

25. A method for interactivity creation and customization as claimed in claim 21, wherein the interactivity editor includes a graphic view parameter selector to allow the user to select said identified parameters relating to images.

26. A method for interactivity creation and customization as claimed in claim 21, wherein the method further comprises developing a select-mode user interface of the interaction model by determining clickable areas, or image hyperlinks, on the user interface of the interactivity and mapping them on parameters defined.

27. A method for interactivity creation and customization as claimed in claim 21, wherein the method further comprises providing a graphic editor and editor form in the interactivity editor to allow a user to customize the identified parameters.

28. A method for interactivity creation and customization as claimed in claim 21, wherein the method further comprises developing an edit-mode user interface of the interaction model by allowing graphic operations with the user interface of the interactivity in background, and by writing code that maps result of those operations with said identified parameters.

29. A method for interactivity creation and customization as claimed in any one of claims 20-28, further comprising the steps of integrating all the modules of the interaction model and adding the interaction model to the interaction model library after testing.

* * * * *